United States Patent
Kim et al.

(10) Patent No.: US 12,295,044 B2
(45) Date of Patent: *May 6, 2025

(54) METHOD AND DEVICE FOR EXECUTING MULTI-BEAM-BASED RANDOM ACCESS PROCEDURE IN WIRELESS COMMUNICATION

(71) Applicant: KT CORPORATION, Seongnam-si (KR)

(72) Inventors: Ki-tae Kim, Seoul (KR); Woo-jin Choi, Seoul (KR)

(73) Assignee: KT CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,591

(22) Filed: May 16, 2024

(65) Prior Publication Data

US 2024/0306213 A1 Sep. 12, 2024

Related U.S. Application Data

(63) Continuation of application No. 17/176,149, filed on Feb. 15, 2021, now Pat. No. 12,022,518, which is a
(Continued)

(30) Foreign Application Priority Data

Nov. 4, 2016 (KR) ........................ 10-2016-0146950
Oct. 18, 2017 (KR) ........................ 10-2017-0135198

(51) Int. Cl.
*H04W 74/0833* (2024.01)
*H04B 7/04* (2017.01)
(Continued)

(52) U.S. Cl.
CPC .......... *H04W 74/0833* (2013.01); *H04B 7/04* (2013.01); *H04W 16/28* (2013.01);
(Continued)

(58) Field of Classification Search
CPC ............. H04W 74/0833; H04W 16/28; H04W 72/0446; H04W 72/046; H04W 74/02; H04B 7/04
See application file for complete search history.

(56) References Cited

U.S. PATENT DOCUMENTS 9,241,348 B2 1/2016 Johansson et al.
9,814,068 B2 11/2017 Frenne et al.
(Continued)

FOREIGN PATENT DOCUMENTS

CN 107371245 A 11/2017
EP 3280070 A1 2/2018
(Continued)

OTHER PUBLICATIONS

NTT Docomo, Inc., "Offline dicussion summary of initial access for NR", R1-1610844, 3GPP TSG RAN WG1 Meeting #86bis, Lisbon, Portugal Oct. 10-14, 2016, pp. 1-4.
(Continued)

*Primary Examiner* — Samina F Choudhry
(74) *Attorney, Agent, or Firm* — Insight Law Group, PLLC; Seung Lee

(57) ABSTRACT

Provided is a method for a base station executing a multi-beam-based random access procedure in wireless communication, and a device therefor. The method may include: transmitting information associated with a RACH resource to a terminal; receiving a multi-RACH preamble from the terminal by a multi-beam; and transmitting a random access response to the terminal.

20 Claims, 10 Drawing Sheets

Related U.S. Application Data continuation of application No. 16/347,568, filed as application No. PCT/KR2017/011989 on Oct. 27, 2017, now Pat. No. 10,966,253.

(51) Int. Cl.
*H04W 16/28* (2009.01)
*H04W 72/044* (2023.01)
*H04W 72/0446* (2023.01)
*H04W 74/02* (2009.01)

(52) U.S. Cl.
CPC ..... *H04W 72/0446* (2013.01); *H04W 72/046* (2013.01); *H04W 74/02* (2013.01)

(56) References Cited

U.S. PATENT DOCUMENTS

| | | |
|---|---|---|
| 10,405,353 B2 | 9/2019 | Guo et al. |
| 10,425,139 B2 | 9/2019 | Guo et al. |
| 10,499,349 B2 | 12/2019 | Hui et al. |
| 10,804,989 B2 | 10/2020 | Chen, IV et al. |
| 2011/0019694 A1 | 1/2011 | Kwon et al. |
| 2012/0314664 A1 | 12/2012 | Johansson et al. |
| 2015/0009951 A1 | 1/2015 | Josiam et al. |
| 2015/0208443 A1 | 7/2015 | Jung et al. |
| 2016/0119958 A1 | 4/2016 | Tan et al. |
| 2016/0157267 A1 | 6/2016 | Frenne et al. |
| 2016/0192398 A1 | 6/2016 | Wang et al. |
| 2016/0192401 A1 | 6/2016 | Park et al. |
| 2018/0070380 A1 | 3/2018 | Nagaraja et al. |
| 2018/0084585 A1 | 3/2018 | Lee et al. |
| 2018/0123650 A1 | 5/2018 | Yu |
| 2019/0104549 A1 | 4/2019 | Deng et al. |
| 2019/0253116 A1 | 8/2019 | Priyanto et al. |
| 2020/0037297 A1 | 1/2020 | Pan |

FOREIGN PATENT DOCUMENTS

| | | |
|---|---|---|
| KR | 20180023136 A | 3/2018 |
| WO | 2016/086144 A1 | 6/2016 |

OTHER PUBLICATIONS

ZTE, "Beamformed Random Access in NR", R1-166419, 3GPP TSG RAN WG1 Meeting #86, Gothenburg, Sweden, Aug. 22-26, 2016.
European Patent Office, European Search Report of corresponding EP Patent Application No. 17866547.7, Apr. 21, 2020.
Huawei et al., "Access mechanism for beam based approach", R1-166088, 3GPP TSG RAN WG1 Meeting #86, Gothenburg, Sweden, Aug. 22-26, 2016, pp. 1-8.
NTT Docomo et al., "WF on RACH Procedure for Multi-beam Operation", R1-1610489, 3GPP TSG RAN WG1 Meeting #86bis, Lisbon, Portugal Oct. 10-14, 2016, pp. 1-5.
Zte et al., "WF on RACH Procedure for Multibeam without gNB reciprocity", R1-1610783, 3GPP TSG RAN WG1 Meeting #86bis, Lisbon, Portugal Oct. 10-14, 2016, pp. 1-6.
Qualcomm Incorporated, "Multi-beam RACH procedure aspects", R1-1610165, 3GPP TSG-RAN WG1 #86bis, Lisbon, Portugal Oct. 10-14, 2016, pp. 1-3.
Samsung, "Random Access Procedure in NR", R2-166065, 3GPP TSG-RAN WG2 95bis, Kaohsiung, Taiwan, Oct. 10-14, 2016, pp. 1-7.
First office action issued on Oct. 10, 2022 for the Chinese Application No. 201780067632.1.
Non-final Office Action mailed on Nov. 7, 2023 from the USPTO for U.S. Appl. No. 17/176,149.
Notice of Allowance mailed on Apr. 15, 2024 from the USPTO for U.S. Appl. No. 17/176,149.
Non-final Office Action mailed on May 21, 2020 from the USPTO for U.S. Appl. No. 16/347,568.
Notice of Allowance mailed on Nov. 17, 2020 from the USPTO for U.S. Appl. No. 16/347,568.
International Search Report mailed on Feb. 12, 2018 for International Application No. PCT/KR2017/011989 and its English translation.

FIG.5

| RB partition with 8$f_0$ | RB0 | | | | RB1 | | | |
|---|---|---|---|---|---|---|---|---|
| RB partition with 4$f_0$ | RB0 | | RB1 | | RB2 | | RB3 | |
| RB partition with 2$f_0$ | RB0 | RB1 | RB2 | RB3 | | | | |
| RB partition with $f_0$ | RB0 | RB1 | RB2 | RB3 | | | | |

METHOD AND DEVICE FOR EXECUTING MULTI-BEAM-BASED RANDOM ACCESS PROCEDURE IN WIRELESS COMMUNICATION

CROSS REFERENCE TO RELATED APPLICATION(S)

This application is a continuation of U.S. patent application Ser. No. 17/176,149, filed Feb. 15, 2021 (now pending), which is a continuation of U.S. patent application Ser. No. 16/347,568, filed on May 3, 2019 (now U.S. Pat. No. 10,966,253), which is a 371 national phase entry of International Application No. PCT/KR2017/011989, filed on Oct. 27, 2017, which claims priority from Korean Patent Application Nos. 10-2016-0146950, filed on Nov. 4, 2016; and 10-2017-0135198, filed on Oct. 18, 2017, the content of which are hereby incorporated by reference for all purposes as if fully set forth herein.

TECHNICAL FIELD

The present disclosure relates to methods and devices for performing a multi-beam-based random access procedure in a next-generation/5G radio access network (hereinafter, referred to as "new radio (NR)").

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Meanwhile, as a method for coping with delay spread caused by multiple paths, a cyclic prefix is included at the beginning of an OFDM symbol in OFDM-based wireless communication systems. A cyclic prefix is included at the beginning of each OFDM symbol in LTE/LTE-Advanced systems as well.

Specifically, in the LTE/LTE-Advanced systems, a base station configures OFDM-based resource elements with the same identical subcarrier spacing and symbol interval and the length of the cyclic prefix according to the size of a cell and corresponding delay spread characteristics. A user equipment detects the length of a cyclic prefix configured in a corresponding cell through the process of receiving a synchronization signal and achieving time/frequency synchronization with the cell.

In this regard, NR systems have been developed for supporting a plurality of numerologies to support various usage scenarios. Therefore it is required to provide a method for configuring the length of a cyclic prefix for other numerologies except for a numerology for transmitting a synchronization signal.

DETAILED DESCRIPTION OF THE INVENTION

Technical Problem

It is an object of the present disclosure to provide a method for a random access channel (RACH) operation needed at the time of operating multi-beam-based uplink for an environment in which Tx/Rx channel reciprocity is not available.

Technical Solution

In accordance with an aspect of the present disclosure, a method of a base station is provided for performing a multi-beam-based random access procedure in wireless communications. The method includes: transmitting information on one or more random access channel (RACH) resources to a user equipment, receiving one or more multi-RACH preambles using multiple beams from the user equipment; and transmitting a random access response to the user equipment.

In accordance with another aspect of the present disclosure, a method of a user equipment is provided for performing a multi-beam-based random access procedure in wireless communications. The method includes: receiving information on one or more RACH resources from a base station, transmitting one or more multi-RACH preambles using multiple beams to the base station; and receiving a random access response from the base station.

In accordance with further another aspect of the present disclosure, a user equipment is provided for performing a multi-beam-based random access procedure in wireless communications. The user equipment includes: a receiver configured to receive information on one or more RACH resources from a base station, and receive a random access response from the base station; and a transmitter configured to transmit one or more multiple RACH preambles using multiple beams to the base station.

Effects of the Invention

In accordance with embodiments of the present disclosure, it is possible to perform a RACH operation needed at the time of operating multi-beam based uplink for an environment in which Tx/Rx channel reciprocity is not available.

BRIEF DESCRIPTION OF THE DRAWINGS

FIG. 5 is a diagram illustrating a resource block (RB) structure in transparent mode data (TMD)-based mixed numerologies.

BEST MODE FOR CARRYING OUT THE INVENTION

Figure 1:
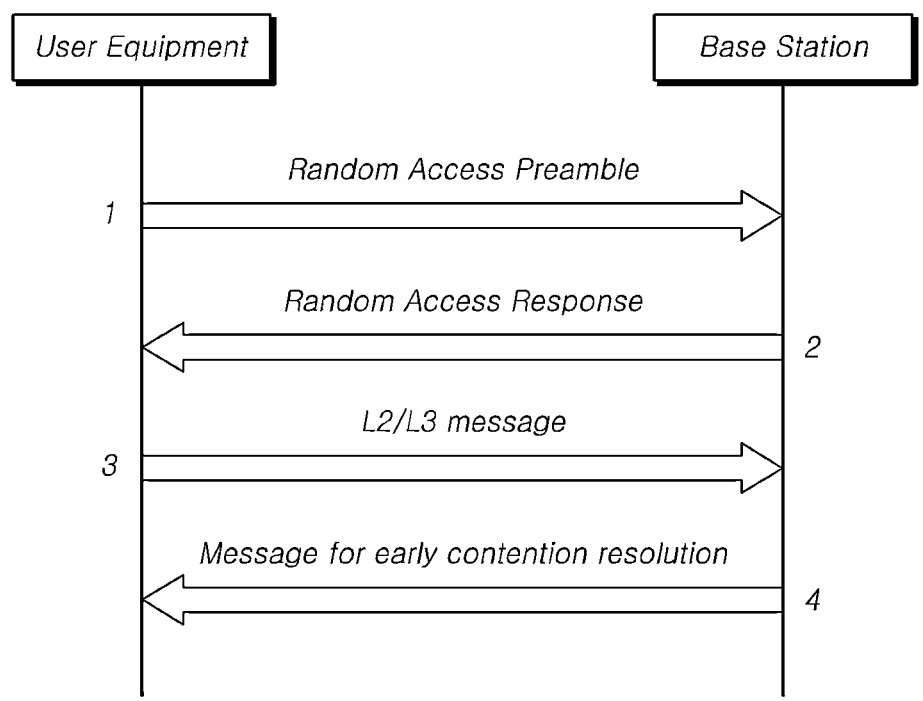
FIG. 1 is a diagram illustrating a contention-based random access procedure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, an machine type communication (MTC) terminal may refer to a terminal supporting low cost (or low complexity), a terminal supporting coverage enhancement, or the like. In the present disclosure, the MTC terminal may refer to a terminal supporting low cost (or low complexity), a terminal supporting coverage enhancement, and the like. In addition, in the present disclosure, the MTC terminal may refer to a terminal classified into a specific category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13.

In the present disclosure, a wireless communication system is widely deployed to provide various communication services, such as a voice communication service, a packet data service, etc. The wireless communication system includes a user equipment (UE) and a base station (BS, eNB, gNB, or xNB). In the present disclosure, the UE is defined as a generic term referring to terminals used in wireless communication. For example, the UE may be referred to, but not limited to, a UE supporting wideband code division multiple access (WCDMA), long term evolution (LTE), high speed packet access (HSPA), or international mobile telecommunications (IMT)-2020 (5G or new radio), a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, in the present disclosure, the base station or the cell is defined as a generic term collectively including, as well as some communication service areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms and provides a corresponding communication service area, such as a megacell, a macrocell, a microcell, a picocell, a femtocell, or a small cell, or 2) a communication service area. In the case of 1), the base station may be referred to i) apparatuses that form and provide a communication service area and are controlled by the same entity or ii) apparatuses that interact and cooperate with each other for forming and providing the communication service area. According to communication schemes employed by a base station, the base station may be referred to as an eNB, a remote radio head (RRH), an antenna, a radio unit (RU), a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. Embodiments according to the present disclosure may be apply to resource allocation in i) asynchronous wireless communication evolving into LTE/LTE-advanced and IMT-2020 from GSM, WCDMA, and HSPA, or ii) synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, in some systems, such as the LTE or LTE-advanced, a related standard specification defines an UL and a DL to be established based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (COMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be i) a base station (BS) or a macro cell (hereinafter, referred to 'eNB') and ii) at least one RRH that is connected to the eNB through an optical cable or an optical fiber, controlled in a wired manner, and has high transmission power or low transmission power in a macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission and reception of a signal through the PUCCH, the PUSCH, the PDCCH, the EPDCCH, or the PDSCH, may be described as the transmission and reception of the PUCCH, the PUSCH, the PDCCH, the EPDCCH, or the PDSCH.

In addition, a description of transmitting or receiving a PDCCH or a description of transmitting or receiving a signal through the PDCCH may be used as meaning including transmitting or receiving an EPDCCH/MPDCCH or transmitting or receiving a signal through the EPDCCH/MPDCCH.

That is, a physical DL control channel described below may mean the PDCCH or the EPDCCH, or is also used as meaning including both the PDCCH and the EPDCCH/MPDCCH.

Also, for convenience of description, the EPDCCH/MPDCCH may be applied to an embodiment including the PDCCH, as an embodiment of the present disclosure, and the PDCCH may be also applied to an embodiment including the EPDCCH/MPDCCH as an embodiment of the present disclosure.

Meanwhile, higher layer signaling described below includes radio resource control (RRC) signaling transmitting RRC information containing an RRC parameter.

The base station performs DL transmission to UEs. The base station may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be Described in Such a Manner that a Corresponding Channel is Transmitted/Received.

[Typical Random Access]

When a UE has not achieved or does not maintain UL synchronization, the UE achieves the UL synchronization using a random access channel (RACH). When the UL synchronization of the UE is achieved, it is possible for a base station to schedule an UL transmission resource maintaining orthogonality. Synchronization based on the RACH may be triggered by following events.

1. In case a UE needs to transmit new UL data when the UE is in an RRC_CONNECTED state but does not archive UL synchronization.
2. In case a UE needs to transmit ACK/NACK in response to newly received DL data when the UE is in an RRC_CONNECTED state but does not archive UL synchronization.
3. In case a UE is handed over from a current cell to a target cell while the UE is in an RRC_CONNECTED state.
4. When a UE is transitioned from an RRC_IDLE state to an RRC_CONNECTED state (e.g., initial access or tracking area update)
5. When a UE reenters a connected state to recover from a radio link failure and when UL resources for transmitting a schedule request (SR) for the UE are not allocated, a RACH may be exceptionally allocated to transmit the SR although the UE already archived UL synchronization.

The NR defines two types of random access procedure which are a contention-based random access procedure and a contention-free random access procedure. In the contention-based random access procedure, since a UE randomly selects and transmits a preamble, a collision occurs when one or more UEs simultaneously transmit an identical preamble. Accordingly, it is necessary to provide a procedure for overcoming such a situation.

In the contention-free random access procedure, a dedicated preamble is allocated to a UE. Therefore, collision does not occur, and the random access procedure is performed at a high speed compared with the contention-based random access procedure. Typically, a UE uses the contention-based random access procedure. Exceptionally, the UE is allowed to use the contention-free random access procedure when the UE is required to perform a random access procedure at a high speed.

FIG. 1 is a diagram illustrating a contention-based random access procedure.

Referring to FIG. 1, the contention-based random access procedure is as follows.

Step1: Preamble Transmission

A base station reserves one or more preambles in advance for use in a contention-free RACH among 64 preambles. Remaining preambles may be used for the contention-based random access procedure and divided into two subgroups. Broadcast system information indicates which one of the two subgroups a UE selects. The UE selects a preamble from a corresponding subgroup according to a required transmission resource size.

The initial value of preamble transmission power is set taking into account path loss. The UE estimates the path loss by measuring the average of reference signal received power (RSRP) of the DL, and the UE sets a power offset, according to a desired Signal to Interference plus Noise Ratio (SINR), UL interference and a noise level measured in a time-frequency slot allocated to a RACH preamble, and a preamble type.

Step2: Random Access Response (RAR)

A base station transmits a random access response (RAR) using a PDSCH, and the RAR is indicated by a random access radio network temporary identifier (RA-RNTI) transmitted through a PDCCH. The RA-RNTI enables to identify the time-frequency slot for detecting a preamble transmitted by the UE.

The RAR transfers information, such as, identification of a detected preamble, timing alignment indication for synchronizing UL transmission of the UE, initial UL resource acknowledgment for transmitting a message in the Step 3, or allocation of a cell radio network temporary identifier (Temporary C-RNTI). An RAR message may include information such as 'backoff indicator', which may instruct to retry the random access procedure after a delay of a predetermined period of time.

Figure 2:
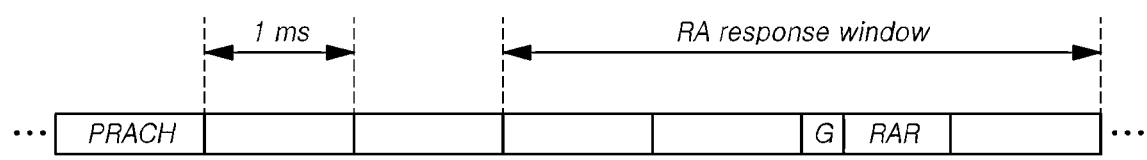
FIG. 2 is a diagram illustrating timing of a random access response (RAR) window.

FIG. 2 is a diagram illustrating timing of a random access response (RAR) window.

Referring to FIG. 2, a UE is expected to receive an RAR within a time window. A base station indicates the beginning point and the ending point of the window and broadcasts as a part of cell specific system information. In the related standard, the earliest subframe is allowed after 2 ms from the ending point of the subframe of a preamble. However, normal delay time (the interval between the ending point of the subframe of a preamble and the beginning point of the first subframe of the RAR window) generally is 4 ms. The RAR is formed of a message in the Step 2 and a DL transmission resource allocation message 'G'. The message in the Step 2 is transmitted using a PDSCH and the 'G' is transmitted using a PDCCH.

When having not received the RAR within the set time window, the UE performs retransmission of the preamble. The minimum delay for preamble retransmission after the end point of the RAR window is 3 ms (even when the UE receives the PDCCH carrying a DL resource used in the RAR, if the UE has not successfully demodulated the RAR message, the minimum delay time before the preamble retransmission increases to 4 ms, considering the time it took for the UE to attempt to demodulate the RAR)

The base station may configure 'preamble power ramping' enabling transmission power to increase with a constant interval for each retransmitted preamble. In WCDMA, the initial preamble power needs to be lowered in order to control the interference, but the control of the preamble power in LTE is less sensitive than the WCDMA because a random access preamble of LTE is usually orthogonal to other UL transmissions. Accordingly, the rate of success of the first preamble transmission in the random access procedure is higher than that of WCDMA, and the need for the power ramping tends to decrease.

Step3: Layer2/3 (L2/L3) Message

The L2/L3 message is a first message scheduled for UL transmission on a PUSCH and uses a hybrid automatic repeat request (HARQ). Using the L2/L3 message, a UE transfers a random access procedure message, such as an RRC access request, a tracking area update, and a scheduling request.

The L2/L3 message includes the Temporary C-RNTI allocated through the RAR in the Step 2 and includes a C-RNTI or 48 bit UE identity (ID).

If a preamble collision occurs in the Step 1, the UEs related to the collided preamble will receive an identical Temporary C-RNTI through the RAR. Therefore, a collision will occur on the same UL time-frequency resource when transmitting L2/L3 messages. If all the UEs have not successfully demodulated due to the collision, each UE restarts the random access procedure after having performed HARQ retransmission a maximum number of times. However, the demodulation may be successfully performed even if the preamble collision occurs. Therefore, in this case, contention may be resolved by a procedure in Step 4.

Figure 3:
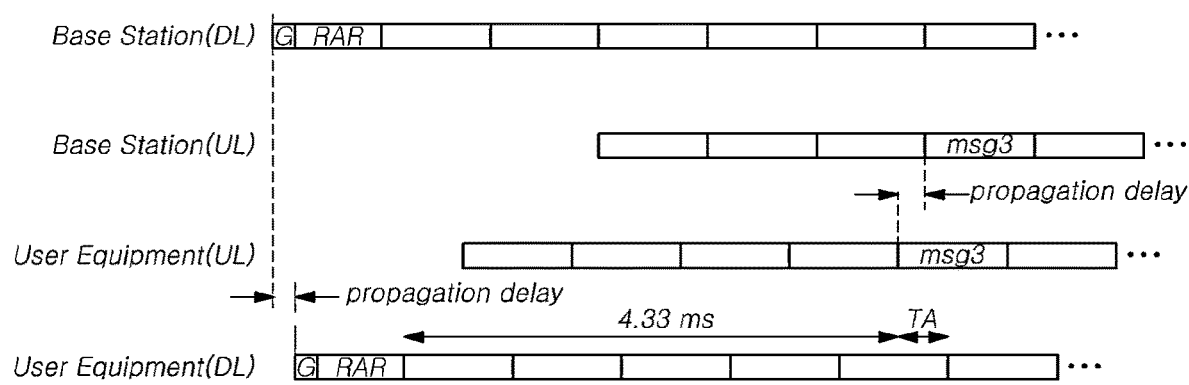
FIG. 3 is a diagram illustrating timing of a random access response.

FIG. 3 is a diagram illustrating timing of a random access response (message 3 transmission).

Referring to FIG. 3, when the UE have received successfully the RAR, a minimum processing delay time of the UE is a value obtained by subtracting a round trip transmission time (TA) from 5 ms before transmitting the message 3.

Step4: Contention Resolution Message

This step is for identifying a UE actually recognized by a preamble when a plurality of UEs transmit an identical preamble.

A base station generates a contention resolution message including a 48 bit UE identity (C-RNTI or Temporary C-RNTI) included in an L2/L3 message in the Step 3 and transmits the generated message to the UE.

When a collision occurs between a plurality of UEs, if the L2/L3 message is successfully demodulated, HARQ feedback is performed only by a UE that has detected its own UE ID (or C-RNTI). Other UEs leave the random access procedure and start a new random access procedure.

After having received the contention resolution message, the UE responses as follows, for three possible scenarios.
  When the UE has successfully demodulated and identified its own UE ID, the UE transmits 'ACK'.
  When the UE has successfully demodulated and recognized that another UE ID is included in the message, the UE does not transmit anything, which is called 'DTX'.
  When the UE has failed to demodulate the message or missed DL acknowledgment, the UE does not transmit anything.

Figure 4:
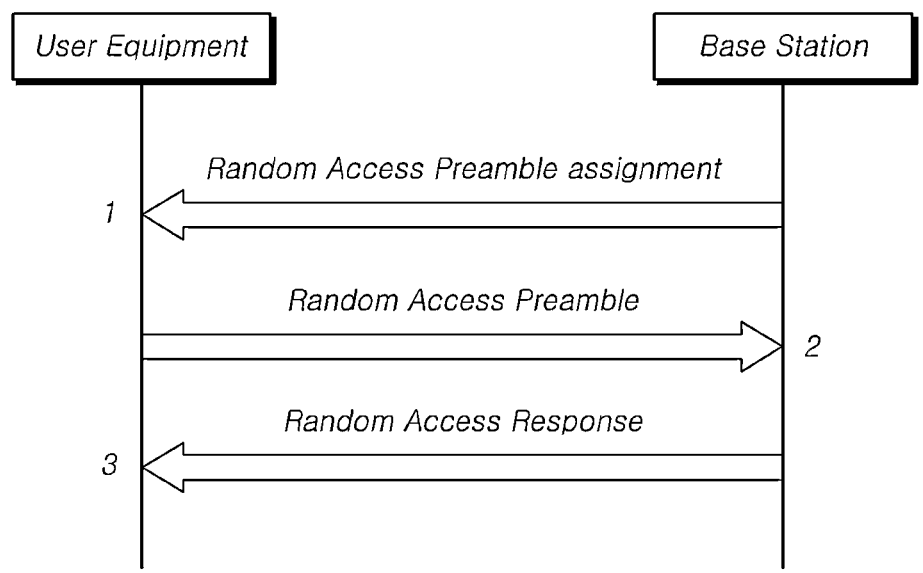
FIG. 4 is a diagram illustrating a contention-free random access procedure.

FIG. 4 is a diagram illustrating a contention-free random access procedure.

Referring to FIG. 4, the contention-free random access procedure is as follows.

A base station designates a preamble for each UE, and the UE transmits the designated preamble, therefore, no collision occurs between UEs. This method is applied when the access procedure should be completed in a short time, such as when DL traffic to a UE is resumed or a handover is performed. This procedure is performed by the following steps.

Step 1: A base station allocates a preamble to a UE.
Step 2: The UE transmits the allocated preamble.
Step 3: The base station transmits a random access response.

Next-Generation/5G Radio Access Network (5G New Radio (NR)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access schemes, and the like for the NR.

It is required to design the NR not only to provide improved data transmission rates compared with the long term evolution (LTE)/LTE-Advanced, but also to meet various requirements in detailed and specific usage scenarios. In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NT to have more flexible frame structures compared with the LTE/LTE-Advanced.

Specifically, the eMBB, mMTC, URLLC are considered as representative usage scenarios of the NR by the 3GPP. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an arbitrary NR system.

For example, likewise the typical LTE/LTE-Advanced, there is a growing need for supporting through one NR frequency band a 1 ms subframe (or a 0.5 ms slot) structure based on a 15 kHz subcarrier spacing, a 0.5 ms subframe (or a 0.25 ms slot) structure based on a 30 kHz subcarrier spacing, and a 0.25 ms subframe (or a 0.125 ms slot) structure based on a 60 kHz subcarrier spacing.

In addition, discussions are in progress for techniques of i) configuring either a subframe (e.g. X=14 or 7, or any other natural number) formed of X OFDM symbols or a symbol (e.g. Y=14 or 7, or any other natural number) formed of Y OFDM symbols as a resource allocation unit in the time domain, e.g., a scheduling unit in time domain, in a numerology, e.g., a subcarrier spacing structure, or ii) defining a mini-slot formed of Z OFDM symbols (i.e. any natural number satisfying Z<Y & Z<X) having smaller granularity than the subframe or the slot.

An RB Structure in TDM-Based Mixed Numerologies

As described above, when a plurality of numerologies are supported through an NR carrier, and a subcarrier spacing for each numerology has a value of $2^n*15$ kHz (n is 0 or a natural number greater than 0), it is defined that subcarriers for each numerology are mapped on the subset/superset of those for a subcarrier spacing of 15 kHz in a nested manner in the frequency domain.

FIG. 5 is a diagram illustrating a resource block (RB) structure in TMD-based mixed numerologies.

In addition, in a case where a frame structure is configured by multiplexing corresponding numerologies in TDM manner, RBs used as a resource allocation unit in the frequency axis through a corresponding NR carrier are defined as the subset/superset of the RB for a 15 kHz-based RB grid in a nested manner, as shown FIG. 5.

In this case, the number of subcarriers forming one RB in each numerology is determined to have a specific number, for example, one of 12 or 16 regardless of a corresponding numerology.

In the NR, studies on a multi-beam based multiple input multiple output (MIMO) transmission technique has been carried out, and techniques for employing it in UL and RACH transmission have also been discussed.

In the present disclosure, a method is provided for transmitting a RACH based on multiple beams. In particular, provided herein are a RACH beam control technique that may be employed when Tx/Rx channel reciprocity is not available, and a random access procedure (or its part) to maintain this.

In 5G NR, there have been discussions on techniques for multi-beam-based initial access. The following is agreements in RAN1 86bis meeting for a RACH operation that is a basic access step.

| Agreements in RAN1 86bis meeting |
| --- |
| When Tx/Rx reciprocity is available at gNB at least for multi-beams operation, the following RACH procedure is considered for at least UE in idle mode |
|    Association between one or multiple occasions for DL broadcast channel/signal and a subset of RACH resources is informed to UE by broadcast system information or known to UE |
|       FFS: Signaling of "non-association" |
|       Detailed design for RACH preamble should be further studied |
|    Based on the DL measurement and the corresponding association, UE selects the subset of RACH resources |
|       FFS: Tx beam selection for RACH preamble transmission |
|    At gNB, the DL Tx beam for the UE can be obtained based on the detected RACH preamble and would be also applied to Message 2 |
|       UL grant in message 2 may indicate the transmission timing of message 3 |
|    For the cases with and without Tx/Rx reciprocity, the common random access procedure should be strived |
|    When Tx/Rx reciprocity is not available, the the following could be further considered for at least UE in idle mode |
|       Whether or how to report DL Tx beam to gNB, e.g., RACH preamble/resource |
|    Msg. 3 |
|       Whether or how to indicated UL Tx beam to the UE, e.g., RAR |

As specified in the basic agreement of the RACH operation, in the case of NR RACH discussed at the standardization meeting, agreement was reached on a method of using multiple beams for the RACH in case Tx/Rx channel reciprocity is available.

However, in case Tx/Rx channel reciprocity is not available, discussions have not been carried out on a specific method, such as a method of controlling beams, a method of indicating beam information to a UE, or the like.

Accordingly, provided herein is a method for a RACH operation needed at the time of operating multi-beam-based UL for an environment in which Tx/Rx channel reciprocity is not available.

Embodiments and/or examples described below are not limited to when the Tx/Rx channel reciprocity is not available. The embodiments may be applied to multi-beam-based RACH transmission using the Tx/Rx channel as well.

Embodiment 1. Performing Sector-Beam-Based RACH Preamble Transmission

Since the Embodiment 1 is based on an environment in which a UE cannot achieve information on its UL transmission (Tx) beam, namely, 'without Tx/Rx reciprocity', discussions are conducted on techniques for transmitting a RACH preamble using a broad-beam below. Further, a sector beam described below is used to mean a term referring to a broad-beam and may be described as various terms such as a group-wise beam, a multi-beam set, and the like.

In accordance with the Embodiment 1, a method of transmitting a RACH preamble starts by configuring a basic RACH resource through an RRC resource configuration.

First, the following configuration information related to the RACH is required to be transmitted to a UE. Such system information may be configured in a similar way to a RACH configuration included in the typical SIB2, or may be configured through the definition of an additional message as well.

Basically, allocating a single RACH resource for a pre-configured period $T_{RACH}$ Repeatedly transmitting a RACH signal $N_{REP}$ times for the $T_{RACH}$ period Using a single resource or $N_{RACH}$ resources for repeated RACH sequences Here, a RACH preamble may be mapped to a RACH sequence with the following two purposes.

Using a single RACH sequence when only a simple RACH search is needed

The use of the single RACH sequence is performed when it is not necessary to acquire the beam direction information of a base station.

It is noted that only a group-wise beam may be used taking into account a possibility of a discrepancy in upward beams caused by the movement of a UE. Accordingly, when receiving a RACH preamble from the UE, the base station may recognize only that the RACH preamble is received, and the base station may not perform candidate detection for the upward beams, specific refinement, and the like.

Using one or more multi-RACH sequences when a RACH search taking beam directionality into account is needed The use of the multi-RACH sequence is performed when it is necessary to acquire the beam direction information of a base station.

It is noted that only a group-wise beam may be used taking into account a possibility of a discrepancy in upward beams caused by the movement of the UE, and different RACH sequences or RACH resources are mapped to each beam. Accordingly, when receiving one or more RACH preambles from the UE, the base station may acquire direction information of upward beam(s) or suitable program coding and beam directivity information according to the reception of the RACH preamble(s).

Figure 6:
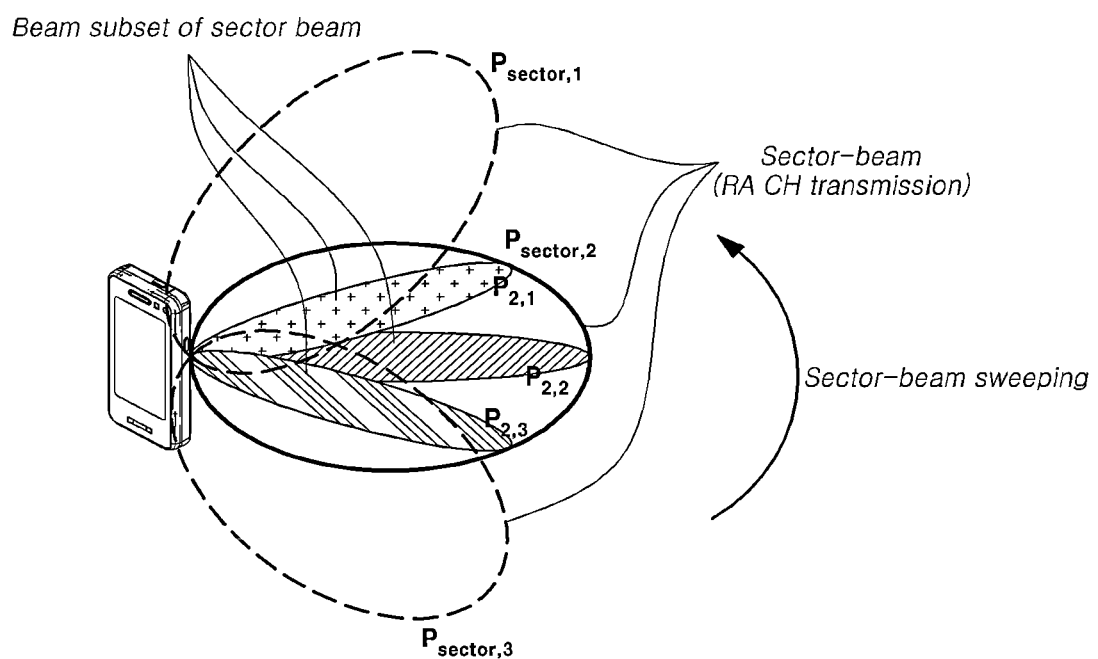
FIG. 6 is a diagram illustrating a method of transmitting a sector-beam-based RACH preamble according to an embodiment of the present disclosure.

FIG. 6 is a diagram illustrating a method of transmitting a sector-beam-based RACH preamble according to an embodiment of the present disclosure.

Common: A form of a sector beam sweeping for a given time (see FIG. 6)

Basically, one or more RACH preambles are transmitted in a specific range or all directions formed by sweeping or rotating in a specific direction with specific directivity in the form of a group-wise beam or sector beam.

Embodiment 1-1

In the Embodiment 1-1, one or more RACH preambles are transmitted sequentially in $N_{RACH}$ directions different from one another in a given time period. That is, in the Embodiment 1-1, in performing beam sweeping for transmitting the RACH preamble, one or more preambles are transmitted in $N_{RACH}$ directions.

For example, as shown in FIG. 6, since the $N_{RACH}$ equals to 3, RACH preambles are transmitted in three directions. Basically, one or more RACH preambles are transmitted in a group type of sector beam form including beam subsets.

At this time, one or more RACH preambles are transmitted sequentially in $N_{RACH}$ directions on the time axis. When a unit of the transmission of the RACH preamble is a subframe, one or more RACH preambles are transmitted through $N_{RACH}$ subframes. When a unit of the transmission of the RACH preamble is a slot, one or more RACH preambles are transmitted through $N_{RACH}$ slots. When a unit of the transmission of the RACH preamble is a symbol, one or more RACH preambles are transmitted through $N_{RACH}$ symbols.

Embodiment 1-2

In the Embodiment 1-2, $N_{RACH}$ sector beams are simultaneously transmitted at a single time, one or more RACH preambles are repeatedly transmitted $N_{REP}$ times for $T_{RACH}$ period. That is, this Embodiment 1-2 is similar to the Embodiment 1-1, in performing beam sweeping for transmitting one or more RACH preambles, one or more preambles are transmitted in $N_{RACH}$ directions. At this time, one or more preambles are transmitted in $N_{RACH}$ directions at the same time.

Accordingly, one or more RACH preambles are transmitted by being multiplexed on the same time-frequency resource, or mapped to orthogonal $N_{RACH}$ RACH resources based on FDM and then the mapped one or more preambles are transmitted.

One or more RACH preambles may be transmitted repeatedly, and the number of repeated transmissions may be defined as $N_{REP}$. The $N_{REP}$ may be set to a value equal to or different from the total number of sector beams $N_{RACH}$.

Embodiment 2

In the Embodiment 2, when receiving sector beam information through one or more RACH preambles of a UE, a base station performs a RACH procedure thereafter using a multi-beam set that belongs to a corresponding sector beam X.

In the Embodiment 2, a method is proposed for defining one or more beam subsets for at least one RACH preamble transmitted in a group-wise beam form. When the UE transmits one or more RACH preambles through a sector beam as shown in FIG. 6, the base station may detect a best-beam or preferable beam candidate for the UE through the detection of the one or more RACH preambles.

To this end, it is required to define beam grouping.

As a first method, the beam grouping may be performed orthogonally to one another as shown in Table 1. That is, the subset beams of each sector beam do not overlap one another. At this time, the base station may recognize the sector mapping of the UE on one-to-one basis through the received one or more RACH preambles.

TABLE 1

Beam grouping in an orthogonal form

| eNB received beam or received RACH preamble | Sector beam | Beam subset |
|---|---|---|
| $P_{1'}$ | $P_{sector,1}$ | $P_{1,1}$ |
|  |  | $P_{1,2}$ |
|  |  | $P_{1,3}$ |
|  |  | $P_{1,4}$ |
|  |  | ... |
| $P_{2'}$ | $P_{sector,2}$ | $P_{2,1}$ |
|  |  | $P_{2,2}$ |
|  |  | $P_{2,3}$ |
|  |  | $P_{2,4}$ |
| ... | ... | ... |

As a second method, the beam grouping may be performed in an overlapping form as shown in Table 2. That is, at least one of subset beams of each sector beam may overlap with another, or two or more of sector beams may be transmitted through one RACH preamble.

For example, as shown in Table. 2, when detecting RACH preamble $P_{1'}$, the base station may recognize that the best-beam in upper beam(s) of the UE is included among sector beam $P_{sector,1}$ and sector beam $P_{sector,2}$. Similarly, when detecting RACH preamble $P_{2'}$, the base station may recognize that the best-beam in upper beam(s) of the UE is included among sector beam $P_{sector,3}$ and sector beam $P_{sector,4}$.

The second method provides more inaccurate information on the best-beam candidate of the UE, but has the advantage that the transmission time of the RACH can be reduced.

TABLE 2

Beam grouping in an overlapping form

| eNB received beam or received RACH preamble | Sector beam | Beam subset |
|---|---|---|
| $P_{1'}$ | $P_{sector,1}$ | $P_{1,1}$ |
|  |  | $P_{1,2}$ |
|  |  | $P_{1,3}$ |
|  |  | $P_{1,4}$ |
|  |  | ... |
|  | $P_{sector,2}$ | $P_{2,1}$ |
|  |  | $P_{2,2}$ |
|  |  | $P_{2,3}$ |
|  |  | $P_{2,4}$ |
|  |  | ... |
| $P_{2'}$ | $P_{sector,3}$ | $P_{3,1}$ |
|  |  | $P_{3,2}$ |
|  |  | $P_{3,3}$ |
|  |  | $P_{3,4}$ |
|  |  | ... |
|  | $P_{sector,4}$ | $P_{4,1}$ |
|  |  | $P_{4,2}$ |
|  |  | $P_{4,3}$ |
|  |  | $P_{4,4}$ |
|  |  | ... |
| ... | ... | ... |

As described above, in the present disclosure, the Embodiments 1, 1-1, 1-2 and 2 have been provided as specific methods for a RACH operation needed at the time of operating multi-beam-based UL for an environment in which Tx/Rx channel reciprocity is not available. Hereinafter, methods of a UE and a base station are discussed for performing a multi-beam-based random access procedure using specific methods for a RACH operation needed at the time of operating multi-beam-based UL for an environment in which Tx/Rx channel reciprocity is not available.

Figure 7:
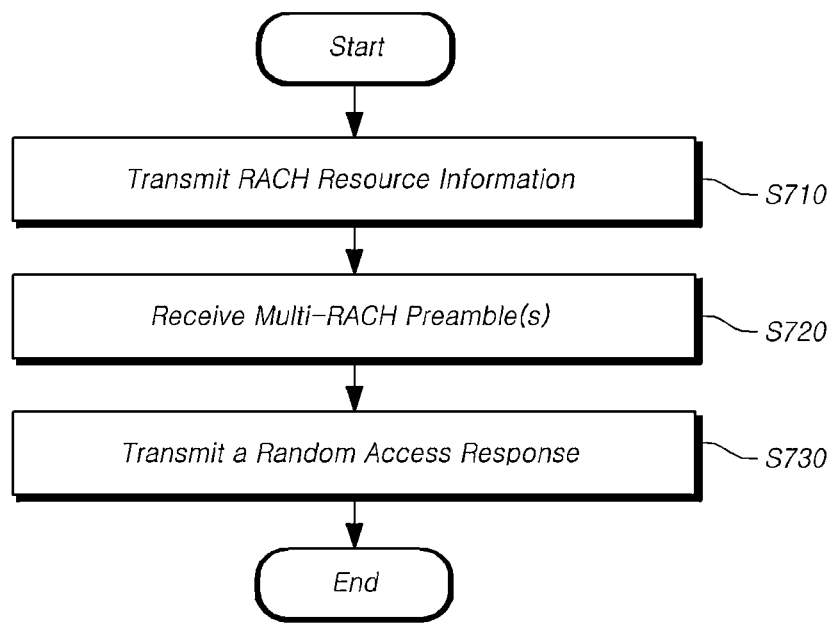
FIG. 7 is a flowchart illustrating a method of a base station for performing a multi-beam-based random access procedure in wireless communications according to an embodiment of the present disclosure.

FIG. 7 is a flow chart illustrating a method of a base station for performing a multi-beam-based random access procedure in wireless communications according to an embodiment of the present disclosure.

Referring to FIG. 7, a method of a base station for performing a multi-beam-based random access procedure in wireless communications includes: transmitting information on one or more RACH resources to a UE at step S710, receiving one or more multi-RACH preambles using multiple beams from the UE at step S720, and transmitting a random access response to the UE at step S730.

The information on one or more RACH resources in step S710 may be transmitted to the UE through an RRC configuration. The information on one or more RACH resource in step S710 may include basic RACH resource configuration information as described in the Embodiment 1, such as a pre-configured period $T_{RACH}$, the number of times $N_{REP}$ transmission is repeated for the period $T_{RACH}$, types of RACH sequence, or the like. At this time, as described in the Embodiment 1, a single RACH sequence may be used when a simple RACH search is needed, and one or more multi-RACH sequences may be used when a RACH search taking beam directionality into account is needed.

The use of one or more multi-RACH sequences is performed when it is necessary to acquire the beam direction information of a base station. In this case, only a group-wise beam may be used taking into account a possibility of a discrepancy in upward beams caused by the movement of the UE, and different RACH sequences or RACH resources are mapped to each beam. Accordingly, when receiving one or more RACH preambles from the UE, the base station may acquire direction information of upward beam(s) or suitable pro coding and beam directivity information according to the reception of one or more RACH preambles.

Basically, one or more RACH preambles are transmitted in a specific range or all directions formed by sweeping or rotating in a specific direction with specific directivity in the form of a group-wise beam or a sector beam.

The reception of one or more multi-RACH preambles from the UE in step S720 may be performed by sequentially receiving the one or more multi-RACH preambles. A unit of the transmission of the multiple RACH preamble may be one of a slot, a subframe or a symbol. The reception of one or more multi-RACH preambles from the UE in step S720 may be performed by one of the number of slots, subframes or symbols, corresponding to the number of the multi-RACH preambles.

As described in the Embodiment 1-1, it is possible to receive sequentially one or more RACH preambles in $N_{RACH}$ directions different from one another for a given time period. That is, in performing beam sweeping for transmitting one or more RACH preambles, the one or more preambles may be received from $N_{RACH}$ directions.

For example, as shown in FIG. 6, since the $N_{RACH}$ equals to 3, RACH preambles are received in three directions. Basically, RACH preambles are received in a group type of sector beam form including beam subsets.

At this time, one or more RACH preambles are received sequentially in $N_{RACH}$ directions on the time axis. When a unit of the transmission of the RACH preambles is a subframe, one or more RACH preambles are received through $N_{RACH}$ subframes. When a unit of the transmission of the RACH preambles is a slot, one or more RACH preambles are received through $N_{RACH}$ slots. When a unit of the transmission of the RACH preambles is a symbol, one or more RACH preambles are received through $N_{RACH}$ symbols.

As described in the Embodiment 1-2, $N_{RACH}$ sector beams are simultaneously transmitted at a single time, one or more RACH preambles are repeatedly transmitted $N_{REP}$ times for $T_{RACH}$ period.

At this time, the multi-RACH preamble may use a multi-RACH sequence. At this time, as described in the Embodiment 1, one or more multi-RACH sequences may be used when a RACH search taking beam directionality into account is needed.

Meanwhile, the random access procedure described above may be a contention-free random access procedure.

Each of multiple beams may include one or more subsets. In this case, the transmission of the random access response to the UE in step S730 may be performed using subsets of multiple beams corresponding to the RACH resources.

One or more beams for transmitting the random access response to the UE may be determined using the subsets of the multiple beams corresponding to the RACH resources, and then the random access response is performed through the determined one or more beams.

As described in the Embodiment 2, when receiving sector beam information through one or more RACH preambles of a UE, a base station performs a RACH procedure thereafter using a multi-beam set that belongs to a corresponding sector beam X.

When the UE transmits one or more RACH preambles through a sector beam as shown in FIG. 6, the base station may detect a best-beam or preferable beam candidate for the UE through the detection of the one or more RACH preambles.

As a first method, the beam grouping may be performed orthogonally to one another as shown in Table 1. That is, the subset beams of each sector beam do not overlap one another. At this time, the base station may recognize the sector mapping of the UE on one-to-one basis through the received one or more RACH preambles.

As a second method, the beam grouping may be performed in an overlapping form as shown in Table 2. That is, at least one of subset beams of each sector beam may overlap with another, or two or more of sector beams may be transmitted through one RACH preamble.

For example, as shown in Table. 2, when detecting RACH preamble $P_{1'}$, the base station may recognize that the best-beam in upper beam(s) of the UE is included among sector beam $P_{sector,1}$ and sector beam $P_{sector,2}$. Similarly, when detecting RACH preamble $P_{2'}$, the base station may recognize that the best-beam in upper beam(s) of the UE is included among sector beam $P_{sector,3}$ and sector beam $P_{sector,4}$.

As described above, wireless communications may be in an environment in which channel reciprocity between an UL beam and a DL beam is not available. That is, there may be an environment in which a UE cannot achieve information on its UL transmission (Tx) beam, namely, 'without Tx/Rx reciprocity'. The environment in which the channel reciprocity between UL and DL beams is not available may mean that there is no Tx/Rx beam correspondence information in next generation wireless communications.

Figure 8:
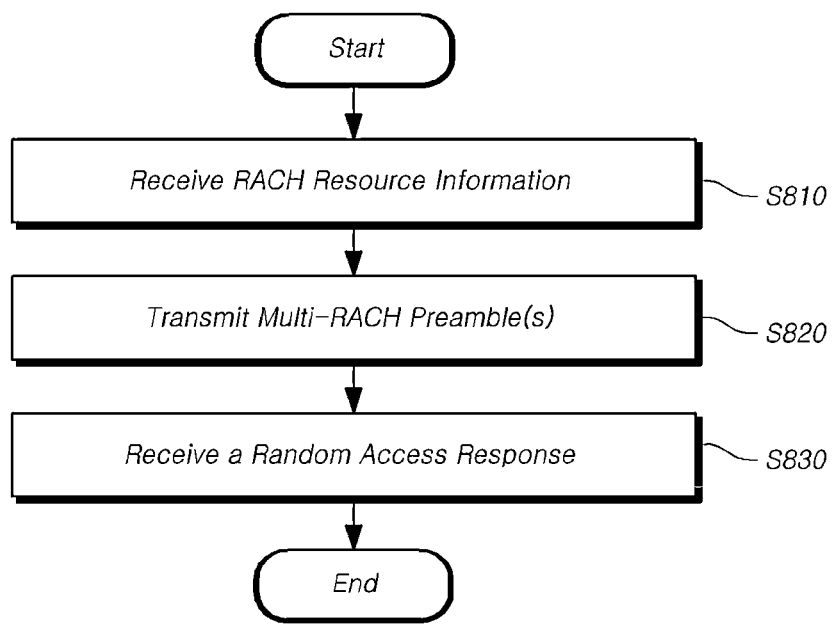
FIG. 8 is a flow chart illustrating a method of a user equipment for performing a multi-beam-based random access procedure in wireless communications according to an embodiment of the present disclosure.

FIG. 8 is a flow chart illustrating a method of a UE for performing a multi-beam-based random access procedure in wireless communications according to a no embodiment of the present disclosure.

Referring to FIG. 8, a method 800 of the UE for performing a multi-beam-based random access procedure in wireless communications includes: receiving information on one or more RACH resources from a base station at step S810, transmitting one or more multi-RACH preambles using multiple beams to the base station at step S820, and receiving a random access response from the base station at step S830.

The information on one or more RACH resources in step S810 may be received from the base station through an RRC configuration. The information on one or more RACH resource may include basic RACH resource configuration information as described in the Embodiment 1, such as a pre-configured period $T_{RACH}$, the number of times $N_{REP}$ transmission is repeated for the period $T_{RACH}$, types of RACH sequence, or the like. At this time, as described in the Embodiment 1, a single RACH sequence may be used when a simple RACH search is needed, and one or more multi-RACH sequences may be used when a RACH search taking beam directionality into account is needed. The use of one or more multi-RACH sequences is performed when it is necessary to acquire the beam direction information of a base station.

The transmission of one or more multi-RACH preambles to the base station in step S820 may be performed by sequentially transmitting the one or more multi-RACH preambles. A unit of the transmission of the multiple RACH preamble may be one of a slot, a subframe or a symbol. The transmission of one or more multi-RACH preambles to the base station in step S820 may be performed by one of the number of slots, subframes or symbols, corresponding to the number of the multi-RACH preambles.

As described in the Embodiment 1-1, it is possible to transmit sequentially one or more RACH preambles in $N_{RACH}$ directions different from one another for a given time period. That is, in performing beam sweeping for transmitting one or more RACH preambles, the one or more preambles may be transmitted to $N_{RACH}$ directions.

For example, as shown in FIG. 6, since the $N_{RACH}$ equals to 3, RACH preambles are transmitted in three directions. Basically, one or more RACH preambles are transmitted in a group type of sector beam form including beam subsets.

At this time, one or more RACH preambles are transmitted sequentially in $N_{RACH}$ directions on the time axis. When a unit of the transmission of the RACH preamble is a subframe, one or more RACH preambles are transmitted through $N_{RACH}$ subframes. When a unit of the transmission of the RACH preamble is a slot, one or more RACH preambles are transmitted through $N_{RACH}$H slots. When a unit of the transmission of the RACH preamble is a symbol, one or more RACH preambles are transmitted through $N_{RACH}$ symbols.

As described in the Embodiment 1-2, $N_{RACH}$ sector beams are simultaneously transmitted at a single time, one or more RACH preambles are repeatedly transmitted $N_{REP}$ times for $T_{RACH}$ period.

At this time, as described in the Embodiment 1, one or more multi-RACH sequences may be used for one or more multi-RACH preambles when a RACH search taking beam directionality into account is needed.

Meanwhile, the random access procedure described above may be a contention-free random access procedure.

As shown in FIG. 6, each of multiple beams (Psector.1, Psector.2, Psector.3) may include one or more subsets (e.g., $P_{2.1}$, $P_{2.2}$, $P_{2.3}$ for the Psector.2). The reception of the random access response from the base station in step S830 may be performed using subsets of multiple beams corresponding to the RACH resources.

The random access response may be received from the base station through beams determined using the subsets of the multiple beams corresponding to the RACH resources.

As described in the Embodiment 2, when receiving sector beam information through one or more RACH preambles of a UE, a base station performs a RACH procedure thereafter using a multi-beam set that belongs to a corresponding sector beam X. As described above, as a first method, the beam grouping may be performed orthogonally to one another as shown in Table 1, or as shown in Table 2, the beam grouping may be performed in an overlapping form.

As described above, wireless communications may be performed in an environment where channel reciprocity between an UL beam and a DL beam is unavailable. That is, the wireless communication may be performed in 'without Tx/Rx reciprocity' environment where a UE is unable to achieve information on its UL transmission (Tx) beam.

In accordance with embodiments of the present disclosure, RACH transmission methods and random access procedures based on procedure multiple beams have been provided for a next-generation/5G radio access network. In particular, provided herein have been RACH beam control techniques that can be employed when Tx/Rx channel reciprocity is not available, and random access procedures (or its part) to maintain these.

Figure 9:
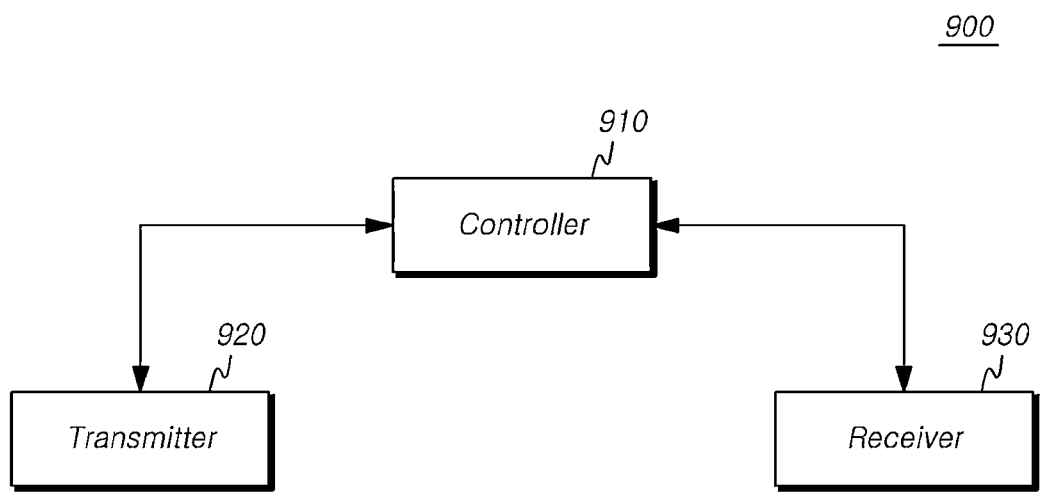
FIG. 9 is a block diagram illustrating a base station, according to an embodiment of the present disclosure.

FIG. 9 is a block diagram illustrating a base station according to an embodiment of the present disclosure.

Referring to FIG. 9, the base station 900 includes a controller 910, a transmitter 920 and a receiver 930.

The controller 910 is configured to control the operation of the base station 900 for transmitting a multi-beam-based RACH in a next-generation wireless communications. The controller 910 is configured to control overall operations of the base station 900 for performing a multi-beam-based RACH procedure in the wireless communications described with reference to FIG. 7.

The transmitter 920 and the receiver 930 respectively are configured to transmit and receive signals, messages, and data necessary for carrying out some embodiments as described above, to and from a UE.

Specifically, the transmitter 920 may be configured to transmit information on one or more RACH resources to the UE, and transmit a random access response to the UE.

The receiver 930 may be configured to receive one or more multi-RACH preambles from the UE using multiple beams. The receiver 930 may be configured to receive sequentially one or more multi-RACH preambles. The receiver 930 may be configured to receive one or more multi-RACH preambles by one of the number of slots, subframes or symbols, corresponding to the number of the multi-RACH preambles.

The transmitter 920 may be configured to transmit the random access response using subsets of the multiple beams corresponding to the RACH resources.

The controller 910 may be configured to determine one or more beams for transmitting the random access response using the subsets of the multiple beams corresponding to the RACH resources. The transmitter 920 may be configured to transmit the random access response to the UE through the determined one or more beams.

Figure 10:
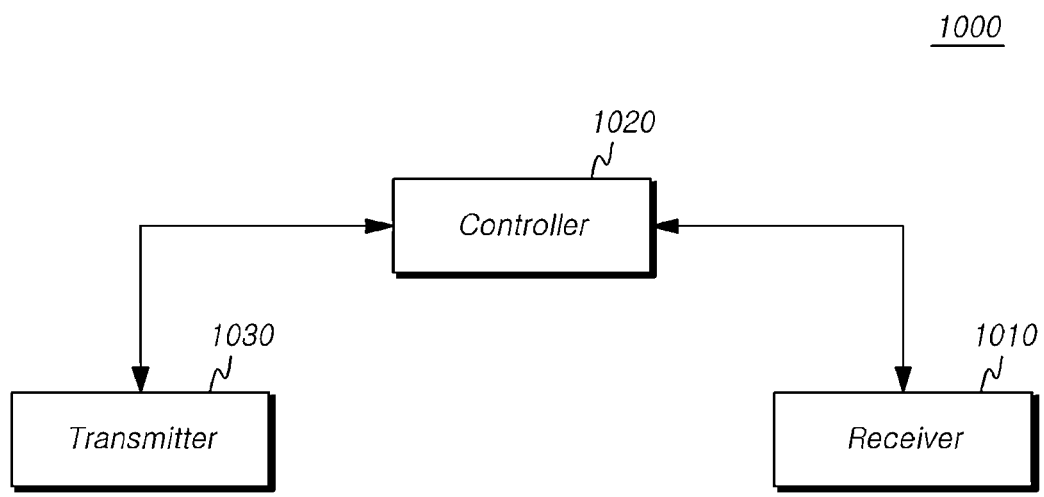
FIG. 10 is a block diagram illustrating a user equipment according to an embodiment of the present disclosure.

FIG. 10 is a block diagram illustrating a user equipment according to an embodiment of the present disclosure.

Referring to FIG. 10, the UE 1000 includes a receiver 1010, a controller 1020 and a transmitter 1030.

The receiver 1010 may be configured to receive DL control information, data, and messages from a base station through a corresponding channel.

The controller 1020 is configured to control the operation of the UE 1000 for transmitting a multi-beam-based RACH in a next-generation wireless communications. The controller 1020 is configured to control overall operations of the UE 1000 for performing a multi-beam-based RACH procedure in the wireless communications described with reference to FIG. 8.

The transmitter 1030 is configured to transmit UL control information, data, and messages to the base station through a corresponding channel.

The receiver 1010 may be configured to receive information on one or more RACH resources from the base station, and receive a random access response from the base station. The transmitter 1130 may be configured to transmit one or more multi-RACH preambles to the base station using multiple beams.

The transmitter 1130 may be configured to transmit sequentially one or more multi-RACH preambles using one or more multi-RACH sequences.

Each of the multiple beams may include one or more subsets. The receiver 1010 may be configured to receive the random access response from the base station using the subsets of multiple beams corresponding to the RACH resources.

The receiver 1010 may be configured to receive the random access response from the base station through beams determined using the subsets of the multiple beams corresponding to the RACH resources.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

What is claimed is:

1. A communication method comprising;
   transmitting information related to one or more random access channel (RACH) resources to a user equipment through radio resource control (RRC) signaling, the one or more RACH resources including information used for beam direction acquisition, different RACH resources mapped to each beam, and one or more RACH preambles being mapped on the one or more RACH resources based on Frequency Division Multiplexing (FDM);
   receiving one or more RACH preambles using the one or more RACH resources from the user equipment during a random access procedure; and
   transmitting a random access response to the user equipment,
   wherein at least one of the one or more random access preambles relates to at least one beam.

2. The method according to claim 1, wherein the one or more random access preamble corresponding to one or more preamble sequences.

3. The method according to claim 1, wherein the random access procedure is performed to select a suitable beam among multiple beams.

4. The method according to claim 1, wherein at least two of the one or more random access preambles are received on different frequencies during a same symbol.

5. The method according to claim 1, wherein the one or more random access preambles relates to candidate beams.

6. A communication method comprising;
receiving configuration information related to one or more random access channel (RACH) resources from a base station through radio resource control RRC signaling, the one or more RACH resources including information used for beam direction acquisition, different RACH resources mapped to each beam, and one or more RACH preambles being mapped on the one or more RACH resources based on Frequency Division Multiplexing (FDM);
transmitting one or more allocated RACH preambles using the one or more RACH resources to the base station during a random access procedure; and
receiving a random access response from the base station, wherein at least one of the one or more random access preambles relates to at least one beam.

7. The method according to claim 6, wherein the one or more random access preamble corresponding to one or more preamble sequences.

8. The method according to claim 6, wherein the random access procedure is performed to select a suitable beam among multiple beams.

9. The method according to claim 6, wherein at least two of the one or more random access preambles are received on different frequencies during a same symbol.

10. The method according to claim 6, wherein the one or more random access preambles relates to candidate beams.

11. A communication device, comprising:
a memory; and
a processor operably coupled with the memory,
wherein the processor is configured to:
cause a user equipment to receive configuration information related to one or more random access channel (RACH) resources from a base station through radio resource control RRC signaling, the one or more RACH resources including information used for beam direction acquisition, different RACH resources mapped to each beam, and one or more RACH preambles being mapped on the one or more RACH resources based on Frequency Division Multiplexing (FDM);
cause to the user equipment to transmit one or more allocated RACH preambles using the one or more RACH resources to the base station during a random access procedure; and
cause a user equipment to receive a random access response from the base station,
wherein at least one of the one or more random access preambles relates to at least one beam.

12. The communication device according to claim 11, wherein the one or more random access preamble corresponding to one or more preamble sequences.

13. The communication device according to claim 11, wherein the random access procedure is performed to select a suitable beam among multiple beams.

14. The communication device according to claim 11, wherein at least two of the one or more random access preambles are received on different frequencies during a same symbol.

15. The communication device according to claim 11, wherein the one or more random access preambles relates to candidate beams.

16. A communication device, comprising:
a memory; and
a processor operably coupled with the memory,
wherein the processor is configured to:
cause a base station to transmit configuration information related to one or more random access channel (RACH) resources to a user equipment through radio resource control RRC signaling, the one or more RACH resources, different RACH resources mapped to each beam, and one or more RACH preambles being mapped on the one or more RACH resources based on Frequency Division Multiplexing (FDM); and
cause to the base station to receive one or more allocated multi-RACH preambles using the one or more RACH resources from the user equipment during random access procedure, and
cause to the base station to transmit a random access response from the base station,
wherein at least one of the one or more random access preambles relates to at least one beam.

17. The communication device according to claim 16, wherein the one or more random access preamble corresponding to one or more preamble sequences.

18. The communication device according to claim 16, wherein the random access procedure is performed to select a suitable beam among multiple beams.

19. The communication device according to claim 16, wherein at least two of the one or more random access preambles are received on different frequencies during a same symbol.

20. The communication device according to claim 16 wherein the one or more random access preambles relates to candidate beams.

* * * * *